Patented Sept. 28, 1954

2,690,442

UNITED STATES PATENT OFFICE 2,690,442

BASICALLY SUBSTITUTED ESTERS OF
$\alpha,\beta,\beta$-TRIARYLACRYLIC ACIDS

Carl Peter Krimmel, Mundelein, Ill., assignor to
G. D. Searle & Co., Chicago, Ill., a corporation
of Illinois No Drawing. Application July 2, 1952,
Serial No. 296,942

5 Claims. (Cl. 260—294.3)

The present invention relates to a new group of esters of $\alpha,\beta,\beta$-triarylacrylic acids and salts thereof. In particular it is concerned with basically substituted esters of $\alpha,\beta,\beta$-triarylacrylic acids of the structural formula

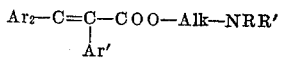

and their salts, wherein Ar and Ar' are monocyclic aryl hydrocarbon radicals containing 6 to 9 carbon atoms, Alk is a lower alkylene radical separating the carboxyl and amino group by at least 2 carbon atoms, and NRR' is a lower dialkylamino, pyrrolidino, or piperidino radical.

In the foregoing structural formula the monocyclic aryl hydrocarbon radicals Ar and Ar' can be either phenyl or lower alkylated phenyl radicals such as tolyl, xylyl, or cumyl. The alkylene group Alk represents a bivalent saturated aliphatic hydrocarbon radical of from 2 to 8 carbon atoms which can be straight or branchchained such as ethylene, propylene, butylene, amylene, trimethylene, tetramethylene, pentamethylene, or hexamethylene. The radicals R and R' represent such lower alkyl radicals as methyl, ethyl, propyl, butyl, amyl, and hexyl, wherein the propyl, butyl, amyl, and hexyl radicals may be either of the straight or branchchained type. The radical NRR' can also be a heterocyclic radical such as a pyrrolidino or piperidino radical.

The organic bases of the foregoing type form nontoxic salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of the sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotylbromide.

It is the object of this invention to provide novel esters of $\alpha,\beta,\beta$-triarylacrylic acids. These esters are of particular value as therapeutic agents. In the form of acid addition salts they are effective coronary dilators and hormonal agents.

My invention will appear more fully from the following characteristic examples which are set forth for the purpose of illustrating this invention but are in no way to be construed as limiting it in spirit or in scope. It will be apparent to those skilled in the art that equivalent amounts of triarylacrylic acids and chloroalkylamines can be used and that many other conventional modifications and methods can be adapted without departing from the scope of the invention. In the examples the temperatures are given uncorrected in degrees centigrade (° C.), pressures in millimeters (mm.) of mercury, and quantities in parts by weight.

Example 1

To a stirred, refluxing solution of 225 parts of triphenylacrylic acid in 2400 parts of anhydrous isopropanol are added 102 parts of $\beta$-chloroethyldiethylamine. After refluxing the reaction mixture for 3 hours, it is freed of isopropanol by vacuum distillation. The residue is taken up in water and ether extracted. The aqueous layer is separated, made basic with sodium hydroxide, and ether extracted. The extract is dried over potassium carbonate and filtered. The filtrate is evaporated on the steam bath to an orange syrup which solidifies on standing. The $\beta$-diethylaminoethyl ester of triphenylacrylic acid thus obtained has the structural formula

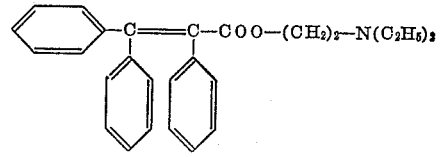

Example 2

To a stirred solution of 145 parts of the $\beta$-diethylaminoethyl ester of triphenylacrylic acid in 14,000 parts of anhydrous ethyl ether is added one equivalent of a 25% solution of hydrogen chloride in isopropanol. A thick flocculent precipitate is formed. The precipitate is suction filtered, dried in a vacuum desiccator, and recrystallized from butanone. The hydrochloride of the $\beta$-diethylaminoethyl ester of triphenylacrylic acid is obtained as a cream-colored, nonhygroscopic powder melting at 200.5–203.0° C.

Example 3

A stirred, refluxing solution of 90 parts of triphenylacrylic acid in 1000 parts of anhydrous isopropanol is treated with 45 parts of $\gamma$-chloropropyldiethylamine and heated at reflux temperature for 3 hours. After vacuum distillation of the solvent, the residue is taken up in water, washed with ether, rendered alkaline by addition of potassium hydroxide, and ether extracted. This extract is dried over potassium carbonate and filtered. Evaporation of the ether yields the γ-diethylaminopropyl ester of triphenylacrylic acid as a pale yellow syrup which is distilled at approximately 230–235° C. and 0.7 mm. pressure.

*Example 4*

An ether solution of the γ-diethylaminopropyl ester of triphenylacrylic acid is treated with one equivalent of 25% hydrogen chloride in isopropanol. The hydrochloride precipitates. After recrystallization from butanone it forms a white crystalline solid melting at about 190–194° C.

*Example 5*

To a stirred refluxing solution of 300 parts of triphenylacrylic acid in 4000 parts of isopropanol are added 148 parts of 1-(β-chloroethyl)-piperidine. After refluxing for 4 hours, the reaction mixture is filtered to remove a small amount of insoluble material. The filtrate is stripped of isopropanol by distillation on the steam bath. After addition of 5000 parts of water to the residue, it is ether extracted and the aqueous phase is separated and made alkaline. The free base is ether extracted and the extract is dried over anhydrous potassium carbonate, filtered, and ether stripped. The residual syrup contains the β-piperidinoethyl ester of triphenylacrylic acid which has the structural formula

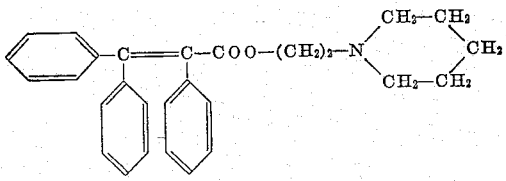

*Example 6*

To a stirred solution of 10 parts of the β-piperidinoethyl ester of triphenylacrylic acid in 7000 parts of anhydrous ethyl ether is added one equivalent of a 25% solution of hydrogen chloride in isopropanol. The hydrochloride is obtained as a white precipitate which is filtered, ether washed, and dried in a vacuum desiccator. After recrystallization from butanone, it melts at 198–200° C.

I claim:

1. A compound of the structural formula

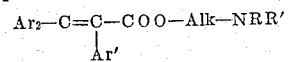

wherein Ar and Ar' are monocyclic aryl hydrocarbon radicals containing 6 to 9 carbon atoms, Alk is a lower alkylene radical separating the carboxyl and amino groups by at least 2 carbon atoms, and NRR' is a member of the class consisting of lower dialkylamino and piperidino radicals.

2. A lower dialkylaminoalkyl ester of triphenylacrylic acid of the structural formula

wherein Alk is a lower alkylene radical separating the carboxyl and amino groups by at least 2 carbon atoms.

3. β-Diethylaminoethyl ester of triphenylacrylic acid.

4. γ-Diethylaminopropyl ester of triphenylacrylic acid.

5. β-Piperidinoethyl ester of triphenylacrylic acid.

References Cited in the file of this patent

UNITED STATES PATENTS

| Number | Name | Date |
| --- | --- | --- |
| 2,379,381 | Shelton et al. | June 26, 1945 |
| 2,430,891 | Shelton et al. | Nov. 18, 1947 |
| 2,576,230 | Krimmel | Nov. 27, 1951 |

OTHER REFERENCES

Chem. Abst. vol. 41, col. 190.